(12) United States Patent
Wu et al.

(10) Patent No.: US 6,203,156 B1
(45) Date of Patent: *Mar. 20, 2001

(54) CONTACT LENSES BEARING MARKS

(75) Inventors: Jongliang Wu; Khaled A. Chehab; Carl G. Crowe; Victor Lust; Richard J. Nason; Timothy R. Poling, all of Jacksonville; Jon Scott Walker, Orange Park, all of FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/052,684

(22) Filed: Mar. 31, 1998

(51) Int. Cl.$^7$ ........................................... G02C 7/04
(52) U.S. Cl. .......................... 351/160 R; 351/160 H; 351/162
(58) Field of Search .................. 351/160 H, 160 R, 351/161, 162, 177

(56) References Cited

U.S. PATENT DOCUMENTS

| | | |
|---|---|---|
| 2,034,308 | 3/1936 | Morgan . |
| 2,803,884 | 8/1957 | Polley . |
| 3,971,910 | 7/1976 | Marschalk et al. . |
| 4,039,827 | 8/1977 | Zdrok et al. . |
| 4,193,671 | 3/1980 | Erickson et al. . |
| 4,194,814 | 3/1980 | Fischer et al. . |
| 4,219,721 | 8/1980 | Kamen et al. . |
| 4,268,133 | 5/1981 | Fischer et al. . |
| 4,406,189 | 9/1983 | Neefe . |
| 4,441,795 | 4/1984 | Lobdell . |
| 4,447,474 | 5/1984 | Neefe . |
| 4,457,761 | 7/1984 | Sliger . |
| 4,525,044 | 6/1985 | Bauman . |
| 4,543,882 | 10/1985 | Ryer et al. . |
| 4,616,910 | 10/1986 | Klein . |
| 4,619,504 | 10/1986 | Daniels et al. . |
| 4,642,439 | 2/1987 | Miller et al. . |
| 4,652,721 | 3/1987 | Miller et al. . |
| 4,744,647 | 5/1988 | Meshel et al. . |
| 4,889,421 | 12/1989 | Cohen . |
| 4,892,595 | 1/1990 | Holmes . |
| 4,912,298 | 3/1990 | Daniels et al. .................. 219/121.69 |

(List continued on next page.)

FOREIGN PATENT DOCUMENTS

| | | |
|---|---|---|
| 25 42 714 A1 | 4/1977 | (DE) . |
| 33 16 730 A1 | 8/1984 | (DE) . |
| 0 031 633 B1 | 1/1984 | (EP) . |
| 0 030 577 B1 | 3/1984 | (EP) . |
| 0 307 874 A2 | 9/1988 | (EP) . |
| 0 601 857 A1 | 9/1993 | (EP) . |
| 0 384 632 B1 | 7/1994 | (EP) . |
| 0 765 732 | 4/1997 | (EP) ............................. B29D/11/00 |
| 1 367 846 | 6/1972 | (GB) . |
| 1 568 160 | 5/1977 | (GB) . |
| 1 583 492 | 6/1977 | (GB) . |
| 1 547 525 | 7/1977 | (GB) . |
| 2 006 114 | 10/1978 | (GB) . |
| 2 026 715 | 4/1979 | (GB) . |
| 2 055 694 | 8/1979 | (GB) . |
| 88-119053 | 5/1988 | (JP) . |
| 7-186290 | 12/1993 | (JP) . |
| 7-5512 | 7/1996 | (JP) . |
| 84/03569 | 9/1984 | (WO) . |
| 89/07281 | 8/1989 | (WO) . |
| 94/12909 | 6/1994 | (WO) . |
| 94/29071 | 12/1994 | (WO) . |

\* cited by examiner

*Primary Examiner*—Scott J. Sugarman
(74) *Attorney, Agent, or Firm*—Anne B. Kiernan

(57) ABSTRACT

This invention provides a contact lens comprising a front surface, a back surface, and an identifying mark, wherein said identifying mark comprises one or more holes depressed into at least one of said surfaces of said lens.

24 Claims, 2 Drawing Sheets

U.S. PATENT DOCUMENTS

| | | |
|---|---|---|
| 4,921,205 | 5/1990 | Drew et al. . |
| 4,976,533 | 12/1990 | Hahn et al. . |
| 5,062,701 | 11/1991 | Drazba et al. . |
| 5,068,514 | 11/1991 | Lunney . |
| 5,147,585 | 9/1992 | Blum . |
| 5,170,192 | 12/1992 | Pettigrew et al. . |
| 5,219,497 | 6/1993 | Blum . |
| 5,244,470 | 9/1993 | Onda et al. . |
| 5,256,853 | 10/1993 | McIntyre . |
| 5,294,379 | 3/1994 | Ross et al. . |
| 5,307,740 | 5/1994 | Yamamoto . |
| 5,326,956 | 7/1994 | Lunney . |
| 5,378,412 | 1/1995 | Smith et al. . |
| 5,417,557 | 5/1995 | Ross et al. . |
| 5,467,149 | 11/1995 | Morrison et al. . |
| 5,494,474 | 2/1996 | Vernon . |
| 5,521,352 | 5/1996 | Lawson . |
| 5,580,498 | 12/1996 | Sugiyama et al. . |
| 5,641,437 | 6/1997 | Williams et al. . |
| 5,936,704 | 8/1999 | Gabrielian et al. ............... 351/160 R |
| 6,024,448 * | 2/2000 | Wu et al. ......................... 351/160 R |

CONTACT LENSES BEARING MARKS

FIELD OF THE INVENTION

The present invention is directed to contact lenses bearing an identifying mark or marks with improved comfort and visibility.

BACKGROUND OF THE INVENTION

It is known to put one or more identifying marks on contact lenses. Identifying marks have been disclosed as useful for indicating which contact lens goes into which eye, the top and the bottom of a contact lens, or the back or the front surfaces of a contact lens. Identifying marks have been disclosed as useful for indicating serial numbers, lot and batch numbers, and optical powers. Identifying marks can also be used by optometrists to measure the rotation of a contact lens on the eye, and identifying marks can be used to orient contact lenses by quality control personnel for inspection purposes.

An identifying mark can be a letter e.g., "A," a number, e.g., "3," a symbol, e.g., "*," a trademark, e.g. "Acuvue®," and a geometric shapes, e.g., "☐," and a homogeneous or heterogeneous group of the one or more of the proceeding list, e.g., "123," and "#A1." The term "identifying mark" is used herein according to this definition.

The prior art discloses many ways to make identifying marks including laser etching and burning as taught in EP 291459 and JP 61223820, and diamond point engraving as disclosed in DE 3316730. Printing techniques, some of which use photosensitive materials which are subjected to UV radiation, are disclosed in GB 200614, DE 3219890, and JP 61211382. Other coloring and dying techniques are disclosed in JP 62186221, JP 2186222, and JP 62250286.

U.S. Pat. No. 5,467,149 discloses that the visibility of an identifying mark cut into an optically clear surface can be improved by making the mark consist of a pattern of regions of varying depth within the boundary of the mark. This patent discloses a mark consisting of stripes cut into the surface of the contact lens, such that the stripes provide a profile having a bottom which is parallel to the surface of the contact lens and sides which are normal to the surface of the contact lens.

DE 3316730 discloses numbering on a soft contact lens consisting of dots which are made by pressing a rounded diamond tip into the contact lens.

U.S. Pat. No. 5,062,701 discloses that lines on a contact lens which are used to measure the rotation of an asymmetric lens can be made up of dots. The preferred method of forming the dots is by using a dye; however within the specification, it states that any of the line segments disclosed in the patent can be formed by laser etching or by lightly abrasive etching.

There still remains a need to improve the visibility of the identifying marks on contact lenses for the user, while still retaining an acceptable comfort level of the marked contact lenses, and keeping the mark small enough so others do not notice the mark when the contact lens is in the eye of the contact lens wearer.

SUMMARY OF THE INVENTION

This invention provides a contact lens comprising a front surface, a back surface and an identifying mark, wherein said identifying mark comprises one or more holes depressed into at least one of said surfaces of said lens, and at least one of said holes comprises a concave surface at the bottom of said hole.

This invention provides a contact lens having an improved identifying mark, because the identifying mark which comprises one or more holes within the identifying mark, of which at least one of said holes comprises a concave surface at the bottom of said hole, has high visibility, and also can be constructed to be very comfortable for the contact lens wearer.

DETAILED DESCRIPTION OF THE INVENTION

Figure 1:
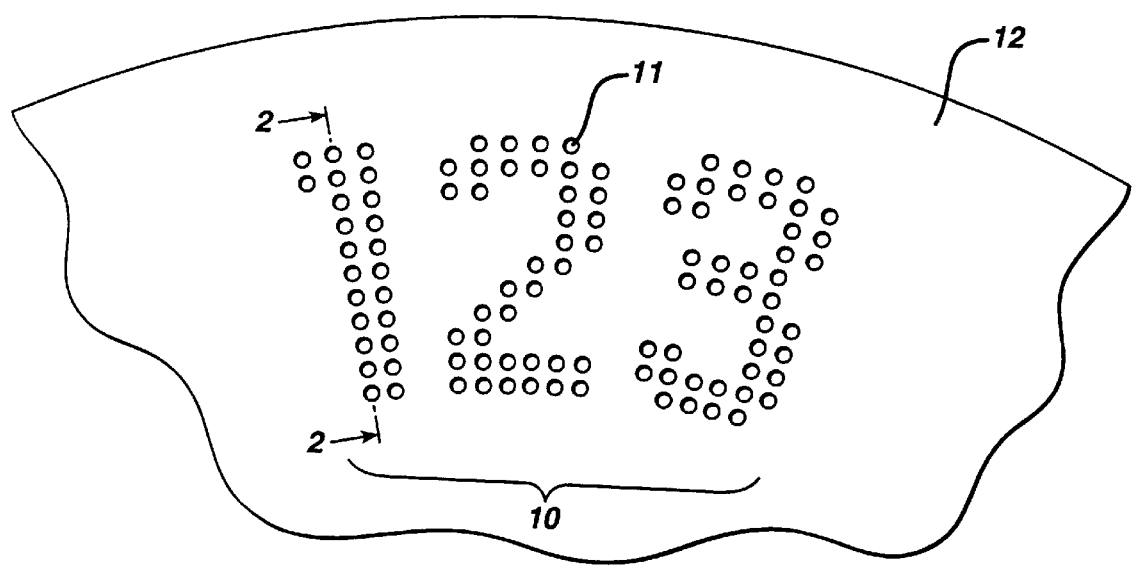
FIG. 1. is a magnified schematic cut-away representation of an identifying mark, "123" on a contact lens according to this invention.
Figure 2:
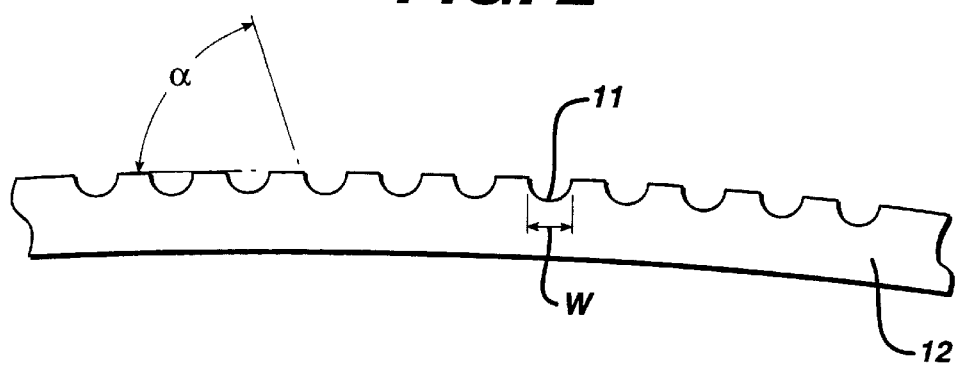
FIG. 2 is a magnified cross-sectional view of the "1" on the contact lens along the line 2—2 shown in FIG. 1.

FIG. 1 shows a magnified schematic representation of an identifying mark, "123" 10 which is depressed into either the front or back surface of a contact lens 12. Each of the numbers of the identifying mark 10 is made up of two substantially equidistant in-line rows of holes 11. Holes consist of a top and a bottom. The top of a holes is usually the edge or rounded edge where the surface of the hole meets the surface of the contact lens, but the top of hole may meet the top of a neighboring hole, or the top of the hole may meet another portion of the identifying mark which may also be depressed below the surface of the contact lens. The rest of the surface of the hole is the bottom of the hole. The top of the holes as seen in a top view of the identifying mark, can be any shape, that is, square, rectangular, diamond, oval, circular, or the like. Circular or substantially circular is preferred as shown in the FIGS. 1 and 3. The surface at the bottom of the holes 11 has a concave shape or surface as shown in FIGS. 2 and 4. As shown in FIG. 2, it is presently preferred that the concave surface faces toward the surface of the contact lens into which the hole is depressed; however, a concave surface facing the opposite surface of the contact lens is covered by the use of the term concave. FIG. 2 shows a magnified cross-sectional view of the holes which make up the "1" along the line 2—2 in FIG. 1. The concave surface of each hole 11 reflects and focuses the light that impinges upon the concave surface of the hole, from both the front or back side of the lens. Such focusing of the light reflected off the concave surface or surfaces of the holes makes the identifying mark more visible than if the surface of the identifying mark were flat, or randomly roughened. The holes and profiles of the holes for the identifying marks are uniform within each figure; however, the holes and/or the profiles of the holes may vary in size, depth, and shape within the identifying mark.

To improve the focusing power of the concave surfaces of the mark, it is preferred that the concave surface of the identifying mark be smooth, that is, the surface preferably has a surface roughness less than 10 microns RMS, more preferably less than 3 microns RMS, and most preferably less than 0.5 microns RMS.

Figure 3:
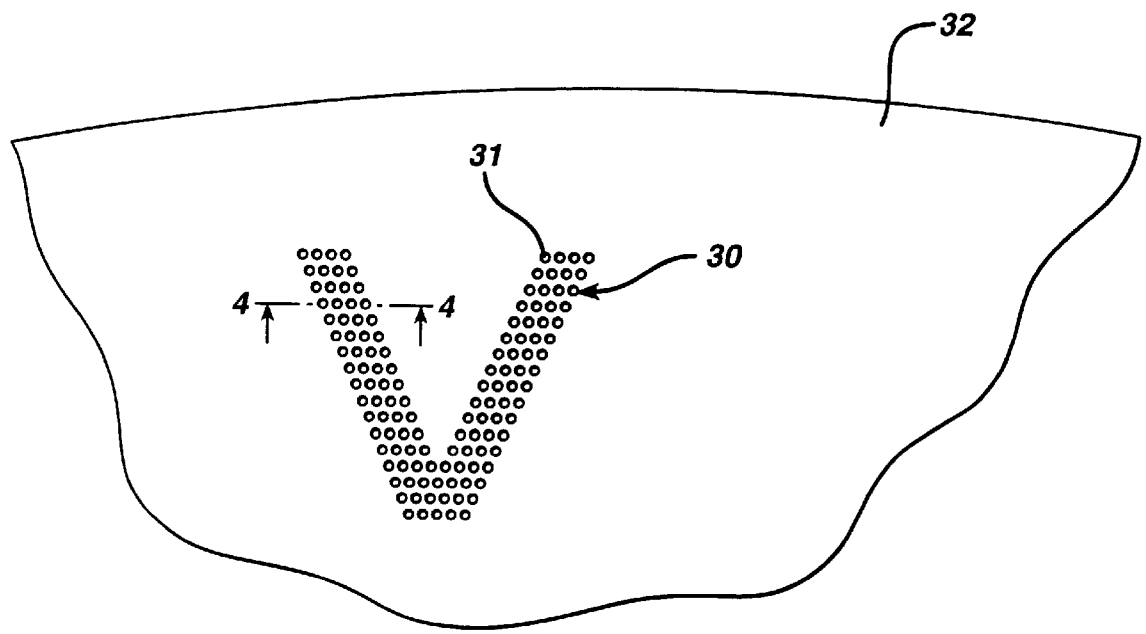
FIG. 3 is a magnified schematic cut-away representation of an identifying mark, "V" on a contact lens according to this invention.
Figure 4:
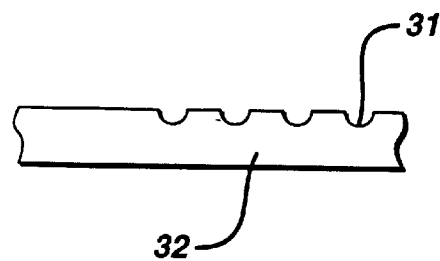
FIG. 4 is a magnified cross-sectional view of the "V" on the contact lens along the line 4—4 shown in FIG. 3.

FIGS. 3 and 4 disclose an additional embodiment of the invention. FIG. 3 shows a magnified schematic representation of an identifying mark, "V" 30 which comprises multiple holes 31 depressed into the surface of a contact lens 32. The "V" is made up of multiple rows of circular holes. FIG. 4 shows a magnified cross-sectional view of the circular holes 31 along the line 4—4 shown in FIG. 3. Again, the concave surfaces at the bottom of the holes 31 reflect and focus the light that impinges upon the concave surfaces of the holes. Such focusing of the light reflected off the concave surfaces of the holes makes the identifying mark more visible than if the surface of the identifying mark were flat or had a random shape.

When the contact lens is held by the wearer, inspector, or practitioner in ambient light or additional light, the identifying mark of this invention has improved visibility. The unaided human eye sees the bright areas of reflected light as bright dots, or if the holes are close enough, as bright lines or other shapes, typically according to the shape of the identifying mark.

Contact lenses may be made with identifying marks by methods well known in the machine tooling and contact lens field, for example, by using a laser, electrical discharge, machining, mechanical scribing, diamond scribing, ultrasonic scribing, holographic marking, and scattering by surface disruption. The marks can be added to the contact lenses after their manufacture, but it is preferred that the marks are added to the contact lenses during their manufacture.

In the preferred manufacturing process, durable molds, preferably metal molds are used to make resin molds into which monomers or prepolymers are added and cured to form contact lenses. The durable molds are preferably used multiple times to make a plurality of the resin molds. The durable molds are often constructed of quartz, glass, stainless steel, copper alloy or brass which may additionally have various nickel or nickel alloy plate coatings. The durable molds may be treated via acid etching, laser, electrolysis, diamond scribing, or according to other methods known by those skilled in the field to cut the desired identifying mark into the surface of the durable mold. The durable mold may then be integrated into the injection molding procedures used to make the resin molds. The resin molds are often thermoplastics, or thermosets, preferably polypropylene or polystyrene, and are preferably only used once to make a contact lens. The identifying mark, according to the preferred embodiment will stick out from the surface of the resin mold. When the prepolymer or monomer mix used to make the contact lens is cured between the mold halves during cast molding, or spin casting and cured, the identifying mark from the durable mold which was imprinted onto the resin mold is transferred to the contact lens. The contact lens can comprise any known material useful for making contact lenses. The preferred contact lenses are soft contact lenses which preferably comprise silicone or hydrophilic hydrogels, which are well known to those skilled in the field. In an alternative process, durable molds can be marked with an identifying mark and used directly to produce contact lenses bearing the identifying mark of this invention.

The preferred methods of marking the durable mold used to make the contact lens of the invention is by using lasers, or diamonds, more preferably lasers, to etch the surface of the durable mold. The preferred laser is a YAG laser. Lasers can be used with or without masks. Masks limit where on the durable mold the laser's radiation will reach to form the shapes and letters of the mark. It is preferred not to use a mask, and instead to control the laser to cut into the durable mold only in the areas of the mark. Preferably, the laser has a laser beam in which the center of the laser beam has the most energy, and the level of energy drops off toward the circumference of the laser beam, thereby producing a concave shape on the durable mold in a single pulse. After laser cutting the durable mold, the mold is preferably polished, for example by orbital polishing, to remove any residual materials, also referred to as slag. The identifying mark shown in FIGS. 1 and 2 was made using a YAG laser. Lasers, e.g. the YAG laser, may be used to directly mark the contact lens, although this is not the preferred method. One reason it is preferred to use the process of marking a durable mold and making a resin mold using the durable mold, is that it is believed that a hole having rough surfaces on the durable mold will have a much smoother surface when transferred to the resin mold and then to the lens; thereby providing a hole having a smooth surface, and better focusing of light characteristics.

It is preferred that the identifying mark is depressed into the surface of the contact lens which does not face the cornea, but which faces the eye lid, typically referred to as the front surface of the contact lens. It was further discovered that in embodiments where the diameter or width shown as w in FIG. 2 of one or more holes making up the identifying mark is large enough for the eyelid to feel the identifying mark on the contact lens, presently, it is believed that this diameter or width is about 100 microns or greater, it is preferred that the angle $\alpha$, which is the angle formed at the junction where the surface of the hole and the surface of the contact lens meet at the top of said hole, as shown in FIG. 2, is less than 20°, more preferably less than 10°, most preferably less than 7° to increase the comfort of the contact lens bearing the identifying mark. It is even more preferred for holes having a diameter greater than 100 microns that the junction where the surface of the depressed region and the surface of the contact lens meet forms a curve having a radius of curvature greater than 5 microns, more preferably greater than 10 microns, most preferably greater than 30 microns, and even more preferably greater than 50 microns. Further, for identifying marks in which the width or diameter of one or more of the holes is greater than 100 microns, the depth of those holes is preferably from 0.5 to 35 micrometers microns, more preferably 5 to 25 (microns,) most preferably 8 to 12 microns. For identifying marks for which any of the hole or holes have larger diameters, to increase comfort, it is preferred that the angle $\alpha$, and the curvature at the bottom of the identifying mark have to be flatter for comfort.

On the other hand, if the identifying mark has a width or diameter less than 100 microns, preferably less than 90 microns, then the eyelid is less sensitive to the shape of the depressed region of the identifying mark, and the angle $\alpha$ can be any size. If the identifying mark is shallow, that is has a maximum depth of less than 10 microns, then $\alpha$ is preferably 30° to 60° to help form the concave surface at the bottom of the depressed region; however, if the identifying mark is deeper, that is from 10 microns to 70 microns, $\alpha$ is preferably from 45° to 90°, more preferably from 60° to 89°, even more preferably from 70° to 85° to form a concave surface having a large radius of curvature at and as the bottom of the identifying mark. There can be multiple concave surfaces at the bottom of the hole, however a single concave surface is presently preferred. For identifying marks in which the width or diameter of one or more of the depressed regions is less than 100 microns, more preferably less than 90 microns, the maximum depth of the marks is preferably between from 10 to 100 microns, more preferably 20 to 75 microns, most preferably between from 25 to 55 microns.

The concave curved surface at the bottom of the holes, and if the diameter of the hole is less than 100 microns, more preferably substantially the whole surface of the holes, can be hyperbolic, parabolic, spherical, elliptical or the like, preferably spherical, more preferably substantially semi-spherical. It is preferred that substantially none of the surface of the holes are parallel to, or perpendicular to the surface of the contact lens. To improve the brightness of the holes of the identifying mark, it is preferred that the diameter or width of each hole is from about 1.0 to 1.8 times the maximum depth of the hole, more preferably about 1.2 to 1.7 times the maximum depth of the hole, and most preferably about 1.3 to 1.6 times the maximum depth of the hole. It is also preferred that the maximum depth of each hole of the identifying mark is located at the center or midpoint of the surface of the hole, and that the surface of the hole between the maximum depth at the midpoint of the hole to the surface of the contact lens is a concave surface, preferably a substantially spherical surface.

The preferred embodiment is shown in FIGS. 1 and 2. Each letter, number or shape within an identifying mark of this invention comprises multiple holes, preferably more than 15 holes, more preferably more than 20 holes, most preferably more than 25 holes per letter, number or shape of the identifying mark. Further, it is preferred that the letter, number or shape of the identifying mark comprise more than 10, more preferably more than 30, most preferably more than 50 holes per mm$^2$ surface area of each letter, number or shape of the identifying mark on the contact lens. It is preferred that at least 25 percent, more preferably more than 50 percent, most preferably more than 75 percent of the holes of the identifying mark comprise a concave surface at the bottom of the holes.

The preferred embodiment comprises one or more rows of holes, preferably two or more rows of holes. The rows of holes are shown in-line; however, they can be offset, random, or otherwise arranged. The holes are preferably 25 to 90 microns in diameter or width, more preferably 50 to 80 microns, most preferably 75 microns in diameter or width, and preferably have a maximum depth of between 25 to 70 microns, more preferably 30 to 45 microns. The holes are preferably spaced so that the center-to-center distance between the holes is between from 5 to 300 microns, more preferably between from 50 to 250 microns and most preferably between from 100 to 175 microns. Unless specially designed for optometrists' use, the overall size of the identifying mark on the contact lens is preferably such that the identifying mark will not be noticeable on the contact lens by an ordinary observer from a foot or more away; therefore, it is preferred that the identifying mark possesses an overall width, which is, for example, the distance across the 1, 2 and 3 of the "123" identifying mark shown in FIG. 1, of between from 0.4 to 10 millimeters, more preferably from between from 0.5 to 7 millimeters, most preferably from 2 to 5 millimeters, and it is preferred that the identifying mark possesses an overall length, which is, for example, the distance from the top to bottom of the 1 of the "123" identifying mark shown in FIG. 1, of between from 0.4 to 5 millimeters, more preferably between from 0.5 to 3 millimeters, and most preferably 1.2 to 1.8 millimeters.

This invention has been described with reference to particular preferred embodiments. Additional embodiments which fall within the scope of the following claims will be apparent to those of ordinary skill in the art.

We claim:

1. A contact lens comprising a front surface, a back surface, and an identifying mark, wherein said identifying mark comprises one or more holes depressed into at least one of said surfaces of said lens, and at least one of said holes comprises a concave surface at the bottom of said hole, and the depth of said hole is 20 microns or greater.

2. The contact lens of claim 1 wherein said at least one of said holes comprising a concave surface is substantially circular from a top view.

3. The contact lens of claim 1 wherein the profile of said concave surface is substantially hyperbolic, elliptical, parabolic or spherical.

4. The contact lens of claim 1 wherein said concave surface is substantially hyperbolic, elliptical, parabolic or spherical.

5. The contact lens of claim 1 wherein said concave surface is substantially semi-spherical.

6. The contact lens of claim 1 wherein said identifying mark comprises a plurality of said holes comprising concave surfaces at the bottom of said holes.

7. The contact lens of claim 6 wherein said holes are arranged into at least two rows.

8. The contact lens of claim 6 wherein said holes comprising concave surfaces have a diameter or width of between from 10 to 100 microns.

9. The contact lens of claim 6 wherein said holes comprising concave surfaces have a maximum depth of between from 20 to 65 microns.

10. The contact lens of claim 6 wherein said holes comprising concave surfaces have a maximum depth of between from 25 to 40 microns.

11. The contact lens of claim 6 wherein said holes comprising concave surfaces have a smooth surface.

12. The contact lens of claim 6 wherein said holes comprising concave surfaces are substantially circular from a top view, and said holes have a substantially semi-spherical concave surface at the bottom of said holes.

13. The contact lens of claim 1 wherein said at least one of said holes comprising a concave surface has a diameter or width of between from 25 to 90 microns.

14. The contact lens of claim 1 wherein said at least one of said holes comprising a concave surface has a diameter or width of between from 50 to 80 microns.

15. The contact lens of claim 1 wherein the diameter or width of said at least one of said holes comprising a concave surface is from 1.0 to 1.8 times the maximum depth of said hole.

16. The contact lens of claim 1 wherein the diameter or width of said at least one of said holes comprising a concave surface is from 1.2 to 1.7 times the maximum depth of said hole.

17. The contact lens of claim 1 wherein said diameter or width of said one or more holes comprising a concave surface is from 1.0 to 1.8 times the maximum depth of said hole.

18. The contact lens of claim 1, wherein said identifying mark comprises more than 10 holes per mm$^2$ surface area of said identifying mark.

19. The contact lens of claim 1 wherein said at least one of said holes comprising a concave surface has a diameter or width of 50 to 80 microns, and a maximum depth of between from 30 to 45 microns.

20. The contact lens of claim 19, wherein said identifying mark comprises more than 10 holes per mm$^2$ surface area of said identifying mark, and at least 20 percent of said holes comprise concave surfaces at the bottom of said holes.

21. A contact lens comprising a front surface, a back surface, and an identifying mark, wherein said identifying mark comprises one or more holes depressed into at least one of said surfaces of said lens, wherein the diameter or width of said at least one of said holes is greater than 100 microns, and the radius of curvature at the junction where the surface of said hole and the surface of said contact lens meet is greater than 10 microns.

22. The contact lens of claim 21 wherein for said at least one hole having a diameter or width of greater than 100 microns, the angle formed at the junction where the surface of said hole and the surface of said contact lens meet is less than 20°.

23. A contact lens comprising a front surface, a back surface, and an identifying mark, wherein said identifying mark comprises a plurality of holes depressed into at least one of said surfaces of said lens, wherein said identifying mark comprises more than 10 holes per $mm^2$ surface area of said identifying mark, and said holes are substantially circular from top view.

24. The contact lens of claim 23, wherein said identifying mark comprises more than 30 holes per $mm^2$ surface area of said identifying mark.

* * * * *